United States Patent [19]
Hoshiba et al.

[11] Patent Number: 6,015,317
[45] Date of Patent: Jan. 18, 2000

[54] MARINE ENGINE OVERHEAT DETECTION SYSTEM

[75] Inventors: Akihiko Hoshiba; Kazuhiro Nakamura, both of Hamamatsu, Japan

[73] Assignee: Sanshin Kogyo Kabushiki Kaisha, Hamamatsu, Japan

[21] Appl. No.: 09/108,590

[22] Filed: Jul. 1, 1998

[30] Foreign Application Priority Data

Jul. 2, 1997 [JP] Japan .................................. 9-177438

[51] Int. Cl.[7] .................................................. B63H 21/22
[52] U.S. Cl. ...................................... 440/1; 440/2; 440/84
[58] Field of Search ............................... 440/1, 2, 84–87, 440/88, 89

[56] References Cited

U.S. PATENT DOCUMENTS

| | | |
|---|---|---|
| 5,327,868 | 7/1994 | Witkowski et al. ..................... 123/421 |
| 5,727,384 | 3/1998 | Ma .............................................. 60/284 |
| 5,769,055 | 6/1998 | Motose et al. . |
| 5,797,775 | 8/1998 | Ozawa et al. ............................... 440/1 |

*Primary Examiner*—Stephen Avila
*Attorney, Agent, or Firm*—Knobbe, Martens, Olson & Bear LLP

[57] ABSTRACT

The present invention is an overheat detection system for an engine having at least one cooling jacket which is drained of coolant when the engine stops running. The detection system includes a sensor for sensing a temperature associated with the cooling jacket. The detection system is arranged to output an overheat signal in the event the temperature sensed by the sensor is above a predetermined temperature except within a predetermined time after the engine has been started.

3 Claims, 12 Drawing Sheets

MARINE ENGINE OVERHEAT DETECTION SYSTEM

FIELD OF THE INVENTION

The present invention is a system for detecting an overheat condition of a marine engine.

BACKGROUND OF THE INVENTION

Watercraft powered by inboard or outboard motors typically include an electrical system. The motor includes a water propulsion device which is powered by an internal combustion engine. As is well known, an ignition system is utilized to fire one or more ignition elements corresponding to each combustion chamber of the engine, igniting the air and fuel mixture in each combustion chamber of the engine.

These engines commonly include a liquid cooling system. Liquid coolant in the form of water in which the watercraft is operating is supplied to various cooling passages or jackets associated with the engine. In some instances, the cooling system is arranged such that the coolant drains from the coolant jackets when the engine is stopped.

In order to prevent engine overheating, an overheat detection system may be associated with the engine. The detection system includes a sensor for sensing the temperature of the engine. The output of the sensor may be used by an engine control unit to shut off the engine by disabling the ignition system.

Figure 12:
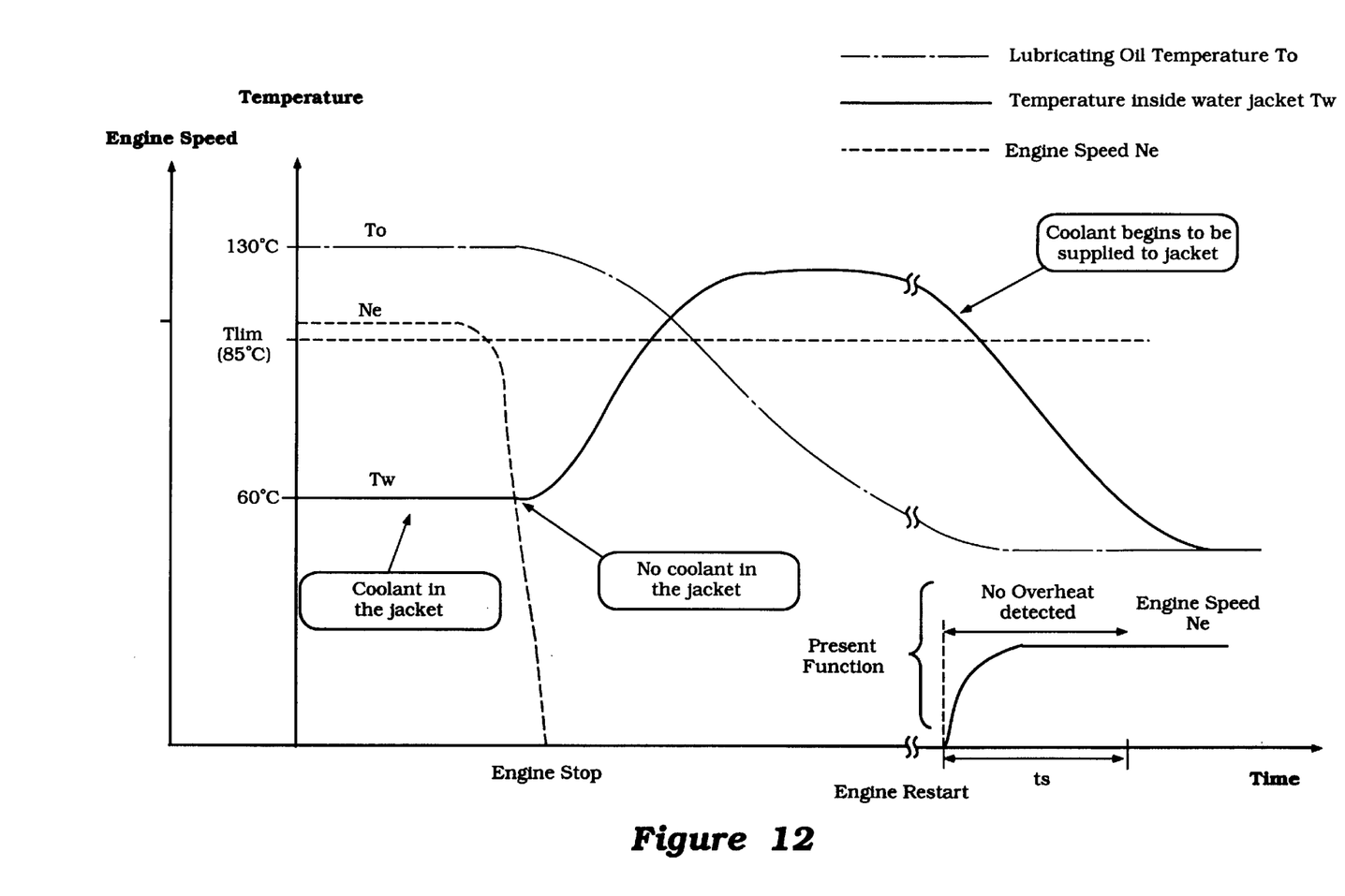
FIG. 12 is a graph illustrating cooling jacket temperature, engine speed and lubricating oil temperature versus time when an engine is running, then stopped and restarted.

This system has the drawback that at certain times a condition of engine overheat may be indicated when in fact the engine is not in an overheat condition. Referring to FIG. 12, when the engine is operating normally and coolant is in the water jacket(s), the temperature inside the water jacket Tw remains lower than a predetermined high temperature Tlim. When the engine is shut off, however, the coolant drains from the jacket and the temperature in the jacket rises. The temperature may rise to a point well above the predetermine high temperature Tlim.

If the engine is subsequently restarted before the temperature in the jacket falls back below the temperature Tlim, the overheat detection system will indicate that the engine is overheated. This is due primarily because coolant is not yet being supplied to the cooling jacket(s).

An improved engine overheat detection system which overcomes the above-stated problems is desired.

SUMMARY OF THE INVENTION

The present invention is an overheat detection system for an internal combustion engine. Preferably, the engine has a cooling system including at least one cooling jacket The cooling system supplies coolant to the cooling jacket when the engine is running for cooling the engine. When the engine is stopped, the coolant drains from the cooling jacket The detection system includes a sensor for sensing a temperature of the cooling jacket. The output of the sensor is compared against a predetermined high temperature. If the temperature exceeds the predetermine high temperature, an overheat signal is output.

The detection system is arranged so that no overheat signal is output within a predetermined time after the engine is started, however, even if the temperature exceeds the predetermined temperature.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is an overheat detection system. Preferably, the system is associated with an engine used in a marine application, such as for powering an outboard motor. Those of skill in the art will appreciate that the overheat detection system of the present invention may be used with engines adapted for use in other applications.

Figure 1:
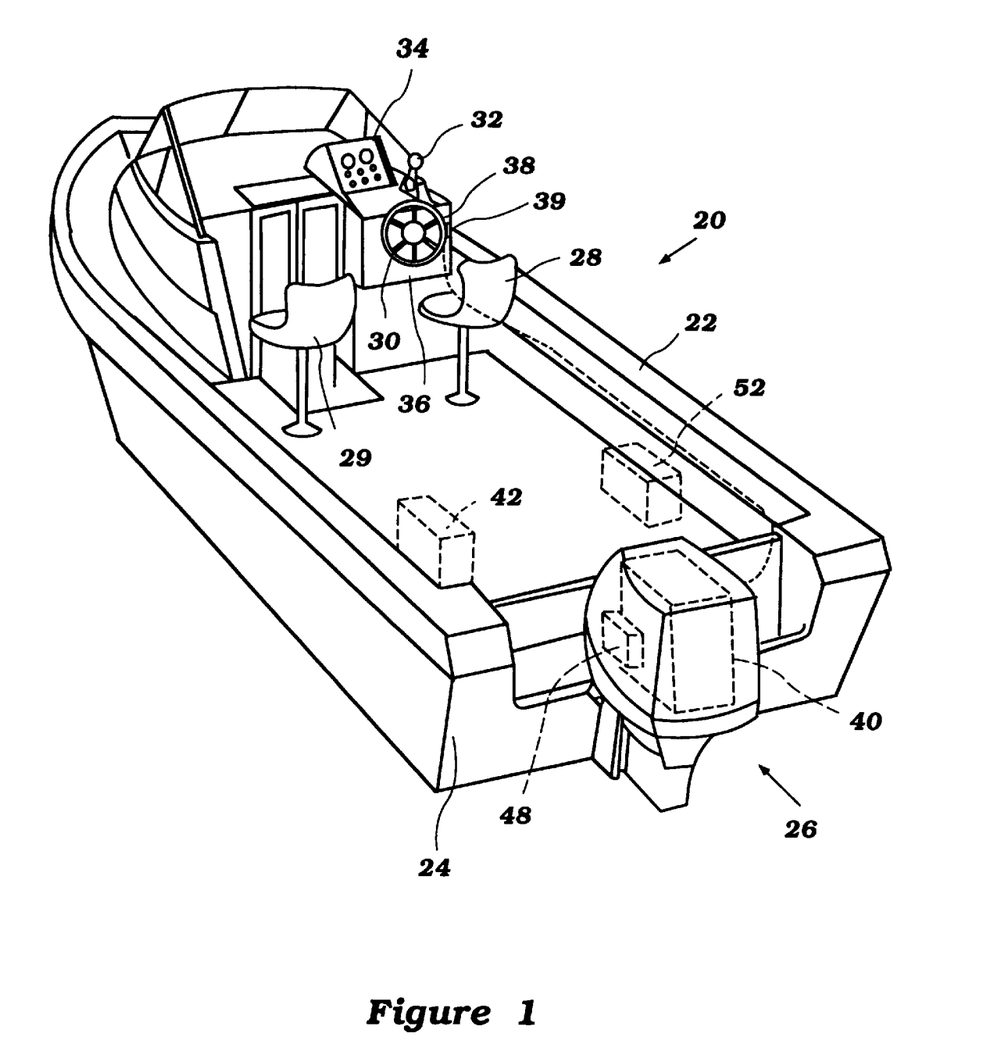
FIG. 1 is a perspective view of a watercraft propelled by an outboard motor.

Referring to FIG. 1, there is illustrated a watercraft 20. The watercraft 20 illustrated is a power boat, may comprise any number of other types of crafts. The watercraft 20 has a hull 22 with a transom portion 24 to which is mounted an outboard motor 26. The outboard motor 26 is utilized to propel the watercraft 20. As known to those skilled in the art, the motor 26 may also be of the inboard type.

When of the outboard variety, the motor 26 is connected to the watercraft 20 in a manner which allows it to pivot up and down in a vertical plane ("trimming") and rotate left and right in a horizontal plane ("steering") in a manner well known to those skilled in the art.

The watercraft 20 illustrated includes a pair of seats 28. One of the seats 28 is preferably positioned near a steering wheel 30. The steering wheel 30 is connected remotely to the outboard motor 26 for effectuating movement of the motor left and right for steering the craft. Additionally, a throttle control such as a handle 32 is preferably positioned near the steering wheel 30 for use in controlling the speed of the watercraft 20 by changing the speed of the engine powering the motor 26. Preferably, this handle 32 simultaneously serves as a shift control lever for controlling the position of a transmission (not shown) associated with the motor 26. Such transmissions are well known, and generally permit the motor 26 to drive in forward, reverse and neutral states.

A control panel 34 is preferably provided near the steering wheel 30, the control panel 34 having one or more gauges, meters or other displays for displaying various information to the user of the watercraft 20. These displays may display watercraft speed and the like. A switch panel 36 is also provided near the steering wheel 30. The switch panel 36 preferably includes one or more switches or controls, such as a main switch 38 and a kill switch 39.

Referring still to FIG. 1, the motor 26 has a water propulsion device, such as a propeller (not shown) which is powered by an engine 40. The engine 40 is preferably mounted within a cowling of the motor 26. The engine 40 may be arranged in a variety of configurations, such as in-line, "V" or opposed, may operate on a two or four-cycle principle, and be of the rotary, reciprocating piston or other type. Preferably, the engine 40 has four cylinders (and thus four combustion chambers) each having a piston reciprocally mounted therein and attached to a crankshaft and operates on a four cycle principle. The engine 40 is oriented within the cowling so that the crankshaft is generally vertically extending and in driving relation with the water propulsion apparatus of the motor 26.

The details of the engine 40 are not described herein and are well known to those of skill in the art. In general, the engine 40 includes a fuel supply system for supplying fuel from a fuel source, such as a fuel tank 42, to each combustion chamber of the engine 40. The engine 40 also includes an induction system for supplying air to each combustion chamber. An exhaust system routes exhaust of combustion from the engine 40 to a point external to the motor 26.

The engine 40 includes an ignition system and ignition control for initiating combustion of the air and fuel mixture supplied to each combustion chamber. This ignition system includes an ignition element associated with each cylinder of the engine. Preferably, and referring to FIG. 2, the ignition elements comprise at least one spark plug 44a–d associated with each cylinder (spark plug 44a corresponding to a first cylinder, spark plug 44b corresponding to a second cylinder, spark plug 44c corresponding to a third cylinder, and spark plug 44d corresponding to a fourth cylinder). As described in more detail below, a firng mechanism is associated with the spark plugs 44a–d for inducing a spark across a gap each spark plug 44a–d in order to initiate ignition of the fuel and air mixture within a combustion chamber or cylinder. In addition, an ignition control system is provided for controlling the firing mechanism.

Figure 2:
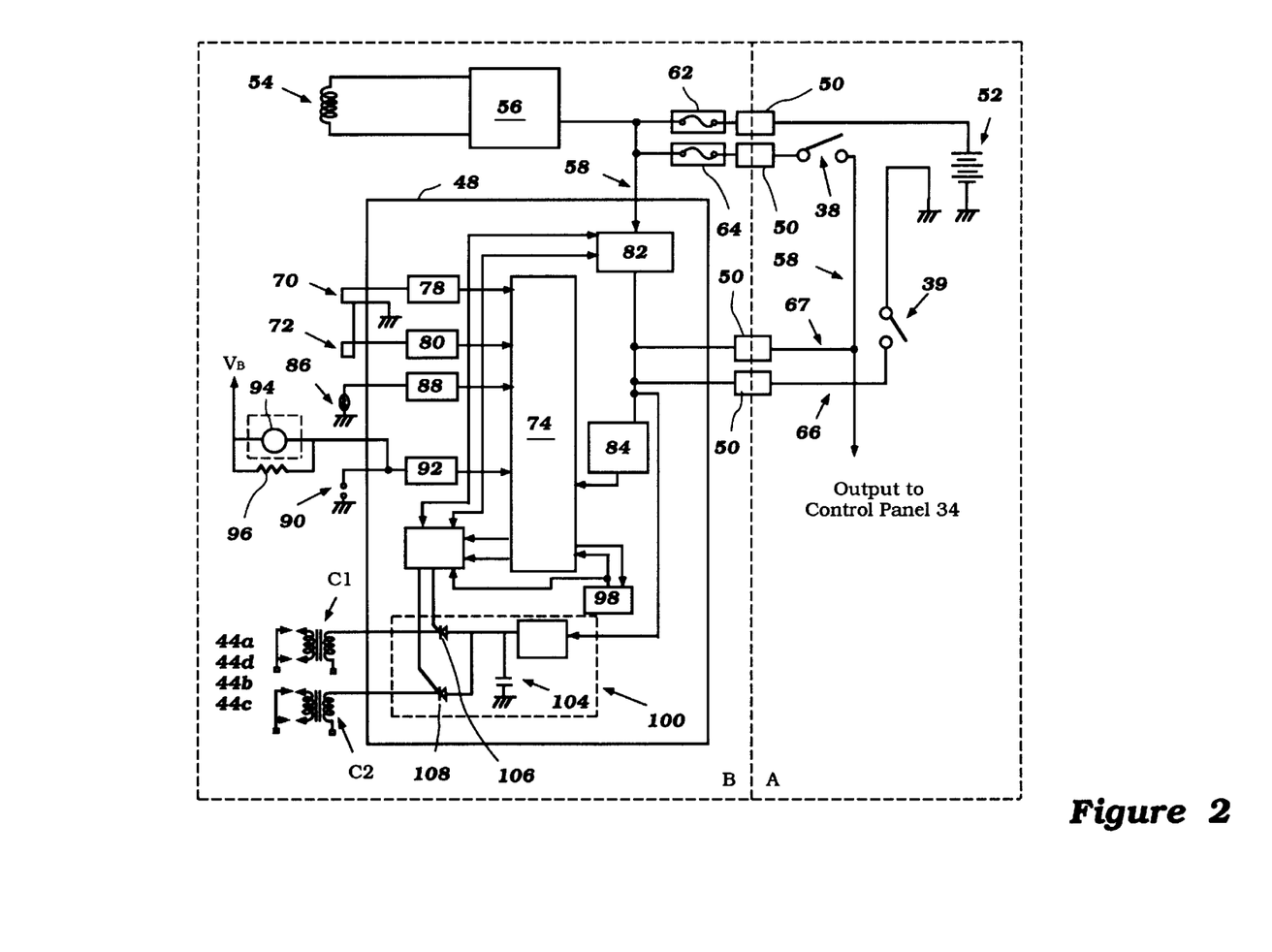
FIG. 2 is a circuit diagram of an electrical system of the outboard motor illustrated in FIG. 1, the electrical system including an ignition control.

FIG. 2 illustrates an electrical system 46 associated with the watercraft 20. The electrical system 46 includes an ignition control circuit 48. In FIG. 2, area A denotes those components of the electrical system 46 which are positioned in the hull 22 of the watercraft 20, while area B denotes those components which are associated with the motor 26.

As the motor 26 is detachable from the watercraft 20, various electrical connectors 50 are included in the electrical system 46. These connectors 50 permit separation and reconnection of those components in the two portions A and B of the electrical system.

The electrical system 46 includes a base or primary power supply. This base power supply preferably comprises a battery 52. As illustrated in FIG. 1, the battery 52 may be conveniently mounted in the watercraft 20.

The electrical system 46 also includes a secondary power supply. This power supply comprises a charging coil 54 associated with the engine 40. For example, the coil 54 may be associated with a flywheel mounted on the output or crankshaft of the engine 40, or be a separate generator, as is known to those of skill in the art. This coil 54 provides an electrical output when the engine 40 is running. The output passes through a rectifier 56. Either the battery 52 or charging coil 54 provides power through an ignition power circuit 58 to the ignition control circuit 48.

As illustrated, power is provided through a watercraft power circuit 58 when the main switch 38 is closed. A main fuse 62 is provided along a circuit connecting the rectified charging coil 54 output and the battery 52 for preventing excessive current from flowing therethrough. Likewise, a similar fuse 64 is provided along the watercraft power circuit 58. During engine start-up, and before the charging coil 54 provides power, when the main switch 38 is closed, power is provided by the battery 52 through a back-up circuit 67. When the coil 54 is charging, power is provided therethrough to the ignition control circuit 48.

As illustrated, power is provided to the various gauges and instruments associated with the control panel 34 through the watercraft power circuit 58.

The kill switch 39 is associated with a kill circuit 66. This circuit 66 connects to the ignition control circuit 48 and grounds the system (stopping the firing of the spark plugs 44a–d and thus stopping the engine 40) when closed.

Figure 3:
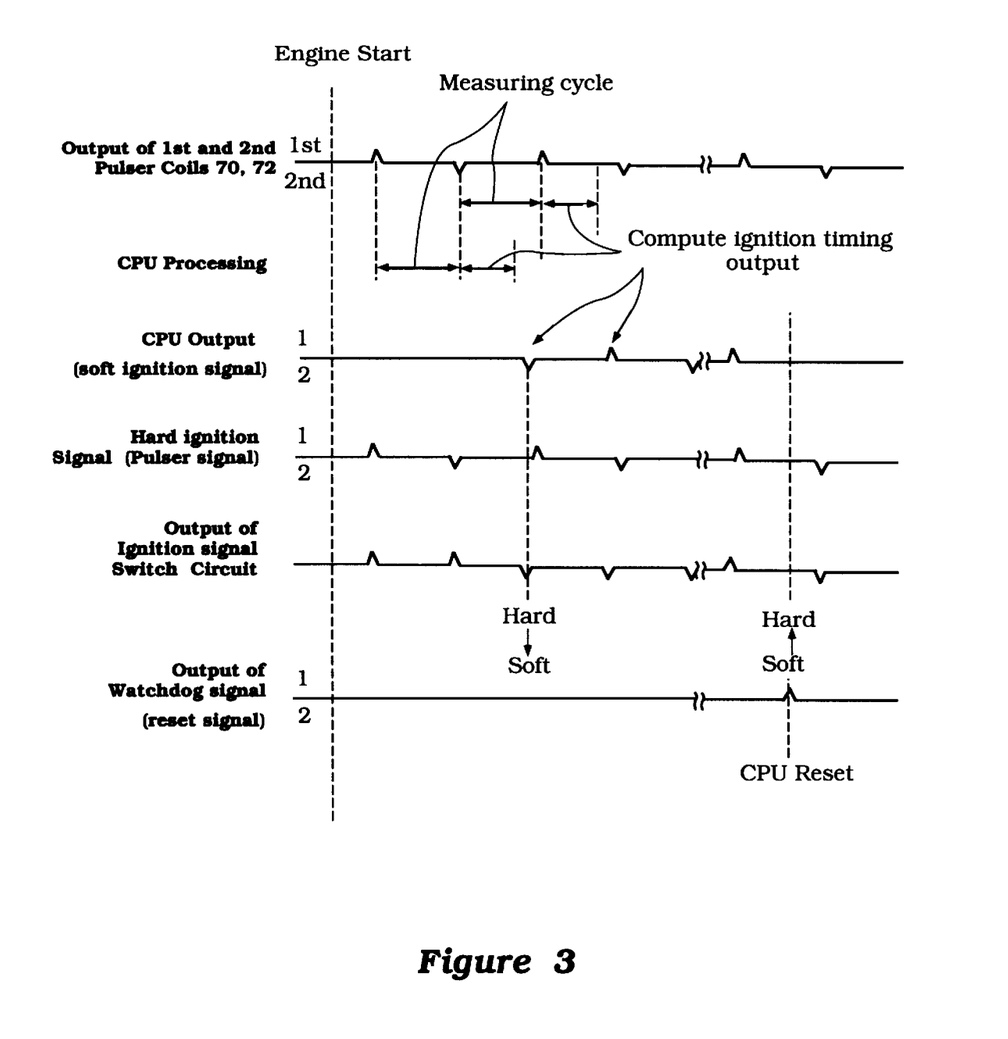
FIG. 3 is a graph illustrating the output of a CPU, switch circuit, watchdog circuit and pulser coils associated with the ignition control.

First and second pulser coils 70,72 are used to generate and output an ignition timing signal, as illustrated at the top of FIG. 3. In general, each pulser coil 70,72 provides an output signal or spike at a specific time, such as when a member mounted on a flywheel of the engine 40 passes by a pick-up element.

In this arrangement, the first pulser coil 70 provides an ignition timing signal corresponding to the spark plugs 44a,44d corresponding to the first and fourth cylinders, while the second pulser coil 72 provides such a signal corresponding to the spark plugs 44b,44c corresponding to the second and third cylinders. The output of the pulser coils 70,72 is provided to a computer processing unit (CPU) 74 and an ignition switching circuit 76 of the ignition control circuit 48 through a respective input circuit 78,80. Power is provided to the CPU 74 through a non-contact type switch 82 through an input circuit 84.

A thermosensor 86 senses engine temperature. The thermosensor 86 may be arranged to monitor the engine temperature by measuring the temperature of a coolant jacket associated with a cooling system of the engine 40. The output of the sensor 86 passes through an input circuit 88 to the CPU 74. As described in more detail below, the CPU 74 utilizes the output of this sensor 86 in an engine overheat detection system.

An oil pressure switch 90 is also provided. When this switch 90 closes, a signal is sent to the CPU 74 through an input circuit 92. At the same time, an alarm or lamp 94 is activated. A load or resistance 96 is associated with the alarm or lamp circuit, as is well known. The alarm or lamp 94 is preferably mounted at or near the control panel 34 of the watercraft 20.

The ignition control circuit 48 includes a watchdog circuit 98. This circuit 98 monitors the condition of the CPU 74. As described in more detail below in conjunction with FIG. 3, the watchdog circuit 98 is arranged to reset the CPU 74 and the switching circuit 76 with an appropriate output signal.

The ignition control circuit 48 also includes a capacitor-discharge ignition (CDI) circuit 100. This circuit 100 includes a control 102 which is powered and which is arranged to control the charging of a charging condenser 104.

The spark plugs 44a,44d corresponding to the first and fourth cylinders are associated with a first ignition coil C1. The spark plugs 44b,44c corresponding to the second and third cylinders are associated with a second ignition coil C2. The first ignition coil C1 is linked through a first circuit to the charging condenser 104, and the second ignition coil C2 is lined through a similar second circuit The CDI circuit 100 includes a first thyristor 106 positioned along the first circuit, and a second thyristor 108 is positioned along the second circuit. Both thyristors 106,108 are controlled by an output signal from the switching circuit 76. When the switching circuit 76 sends an appropriate signal to either of the thyristors 106,108, they open and current is allowed to flow from the condenser 104 through the first or second circuit to the first or second ignition coil C1,C2, at which time a spark is induced at the spark plugs corresponding thereto.

Those of skill in the art will appreciate that in the four-cycle engine, each cycle comprises seven-hundred and twenty degrees of crankshaft rotation. In one three-hundred and sixty-degree rotation, each piston moves from top dead center downwardly to bottom dead center in an induction mode, then moves back to top dead center for combustion. In the next three-hundred and sixty degree cycle the piston moves downwardly as driven by the expanding combustion gasses, and then moves upwardly back to top dead center in an exhaust sequence.

In the engine arranged as described above, the piston corresponding to a pair of cylinders (such as the first and fourth cylinders) are generally in the same position, but three-hundred and sixty degrees apart in the operating cycle. In other words, when the piston corresponding to the first cylinder is at top dead center for combustion, the piston corresponding to the fourth cylinder is also at top dead center but in the exhaust sequence. Likewise, the second and third cylinders are so interrelated.

In the arrangement of the present invention, the spark plugs 44a,44d corresponding to the first and fourth cylinders are fired at the same time. As described in more detail below, the firing of the spark plug corresponding to cylinder which is in the combustion portion of the cycle is effective in initiating combustion, while the simultaneous firing of the spark plug corresponding to the other cylinder is ineffective since it is in exhaust mode. Thus, in each firing of both pairs of spark plugs 44a/44d and 44b/44c only one of the firings is "effective" or "actual" in the sense that it initiates combustion.

A first aspect of the ignition control will be described with reference to FIG. 3. Once the engine 40 is started, the pulser coils 70,72 provide output signals and the CPU 74 begins processing. In the preferred arrangement, the CPU 74 does not begin to provide an ignition timing output signal for some time after the engine 40 has been started. In the arrangement illustrated, this time constitutes two measuring cycles. These measuring cycles comprise a time between pulses or output spikes from the first and second pulser coils 70 and 72. Thereafter, the CPU 74 provides a second or "soft" ignition timing signal which is based on, but may vary from, the first signal from the pulser coils 70,72. The CPU 74 may alter the first signal based on a variety of factors to optimize ignition firing timing.

During the time before the CPU 74 provides an ignition timing output signal, the spark plugs 44a–d are fired based on the output of the pulser coils 70,72. In particular, the output of the pulser coils 70,72 is provided to the switching circuit 76, which uses the signals directly as the ignition signals for the thyristors 106,108. After the CPU 74 begins providing an ignition firing signal, the switching circuit 76 is arranged to move to a "soft" mode in which it utilizes the ignition timing signal from the CPU 74 as the ignition firing timing signal (i.e. the signals from the pulser coils 70,72 are used unless the CPU 74 is providing a signal). This arrangement is advantageous since it provides time for the CPU 74 to calculate an accurate firing timing signal considering actual engine conditions.

As also illustrated in this figure, in the event of engine shut-down or lack of power or the like, the watchdog circuit 98 is arranged to reset the CPU 74. Until the time for the CPU 74 to provide ignition timing signals has elapsed, the switching circuit 76 is arranged to utilize the hard ignition tiring signals from the pulser coils 70,72, as described above.

Figure 4:
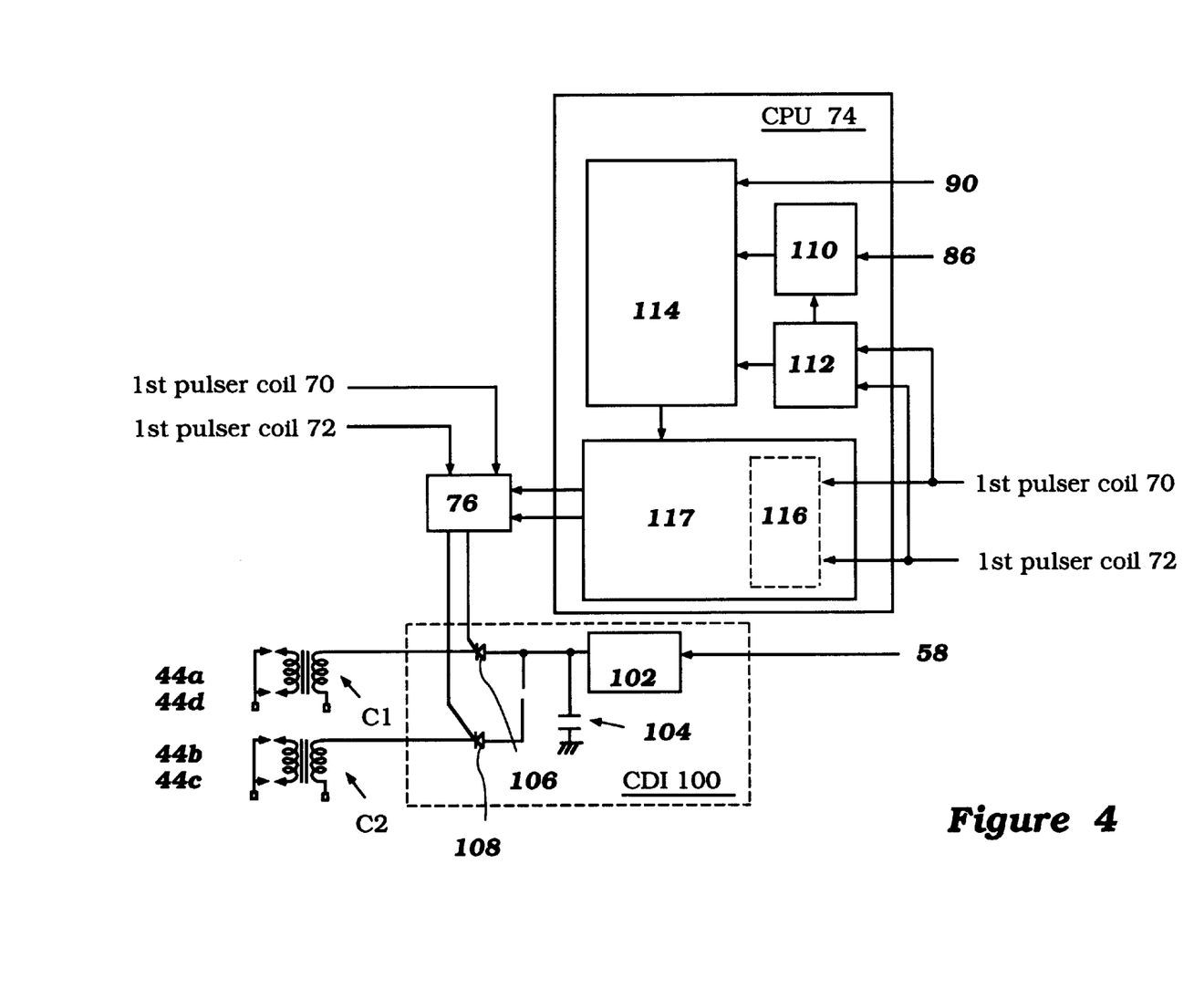
FIG. 4 is a diagram illustrating in greater detail an ignition control circuit of the ignition control.

Additional aspects of the ignition control will be described with reference to Figure 4. As illustrated, the CPU 74 preferably includes an overheat detection portion 110, an engine speed computation portion 112, a disabling cylinder determining portion 114, and an ignition signal output portion 117 which includes an ignition order counter portion 116..

The output of the thermosensor 86 is provided to the overheat detection portion 110. In the event an engine overheat situation is detected, an engine overheat protection function is employed by the CPU 74, as described in more detail below in conjunction with FIGS. 9–12.

The output of the pulser coils 70,72 is provided to the engine speed computation portion 112, which determines the engine speed from the output of the pulser coils 70,72. As described in more detail below, the CPU 74 employs an engine speed reduction or overrev prevention function in the event the engine speed exceeds a predetermined speed.

The output of the pulser coils 70,72 is also provided to the ignition order counter portion 116 of the CPU 74. This portion of the CPU 74 is arranged to utilize the pulser coil 70,72 signal output to count and assign a count value to these signals.

Figure 5:
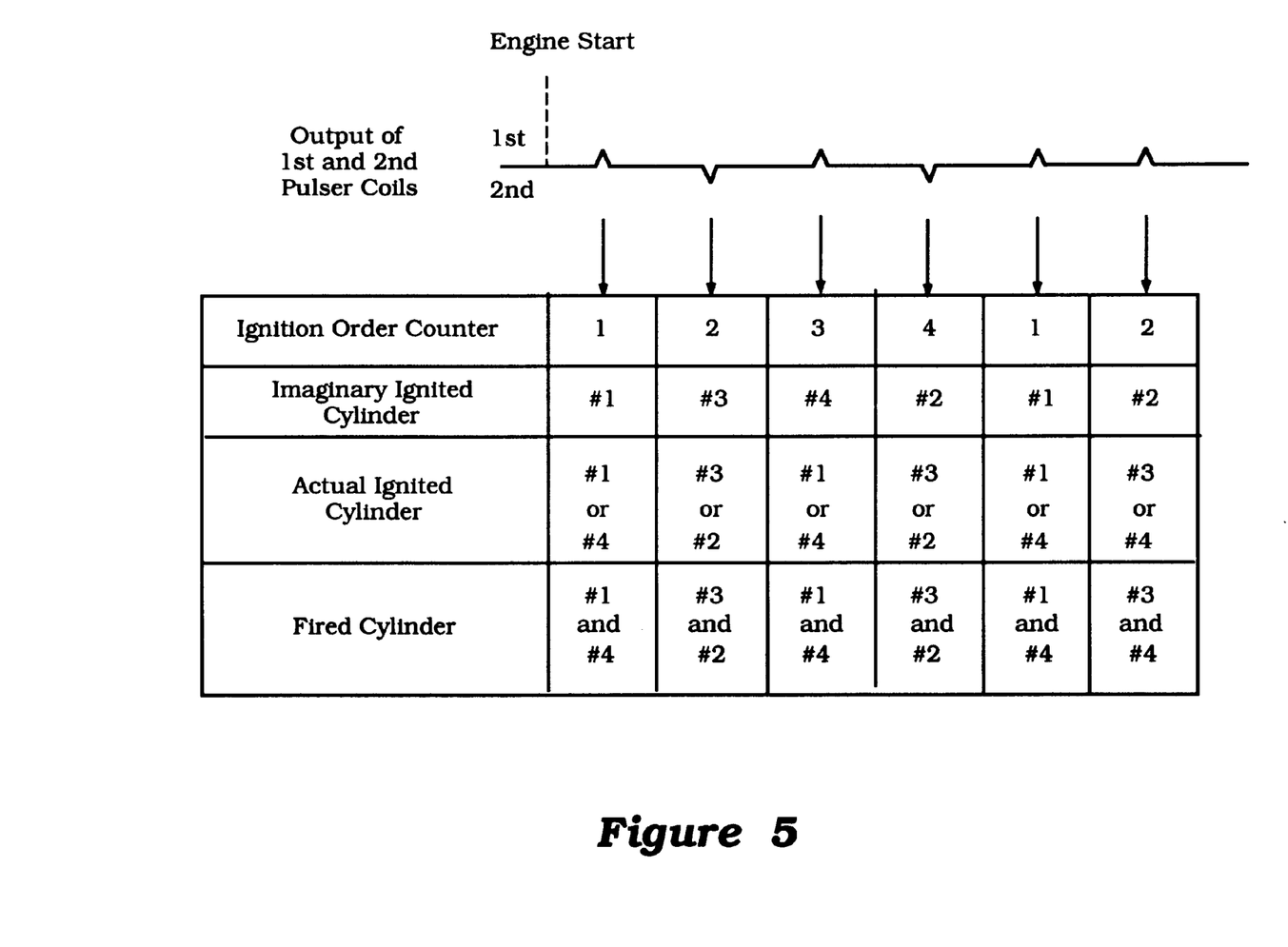
FIG. 5 is a table illustrating ignition order counter, imaginary ignited cylinder, actual ignited cylinder and fired cylinder data of the ignition control as compared to pulser coil output.

FIG. 5 is a table which correlates the pulser coil 70,72 outputs to a variety of cylinder firing data. When the first pulser coil 70 provides a first signal, the ignition order counter 116 gives the signal a value of 1. In the arrangement where the firing order for the cylinders is arranged to be 1, 3, 4, 2, the first signal is assumed to correspond to cylinder 1 In other words, an imaginary ignited cylinder value of 1 is assigned, since it is assumed the first cylinder fired. Since the first pulser coil 70 corresponds to the spark plugs 44a,44d corresponding to the first or fourth spark plugs, the fired cylinders associated with this signal number are 1 or 4. In actuality, because only one of those two cylinders is in the combustion portion of the cycle (the other being in the exhaust cycle) the cylinder in which ignition actually occurs is either cylinder 1 or cylinder 4.

The next signal received by the ignition order counter 116 is from the second pulser coil 72. When this signal is received, it is given a value of 2. The cylinder which is imagined to have fired is cylinder 3 (i.e. the second of the cylinders to fire in the firing order), and the actually fired cylinders must be 2 or 3, since the two spark plugs corresponding thereto fire together. Since only one of the cylinders is then in the combustion cycle, in either only cylinder 2 or 3 does ignition actually occur.

The next signal received by the ignition order counter 116 is from the first pulser coil 70. When this signal is received, it is given a value of 3. The imaginary cylinder firing corresponding to this value is 4, both cylinders 1 and 4 are actually fired, but combustion is only initiated in either cylinder 1 or 4.

The next signal received by the ignition order counter 116 is from the second purser coil 70. When this signal is received, it is given a value of 4. The imaginary cylinder firing corresponding to this value is 2, the actually fired cylinders are 2 or 3, with combustion initiated in only cylinder 2 or 3. The data then repeats.

Figure 6:
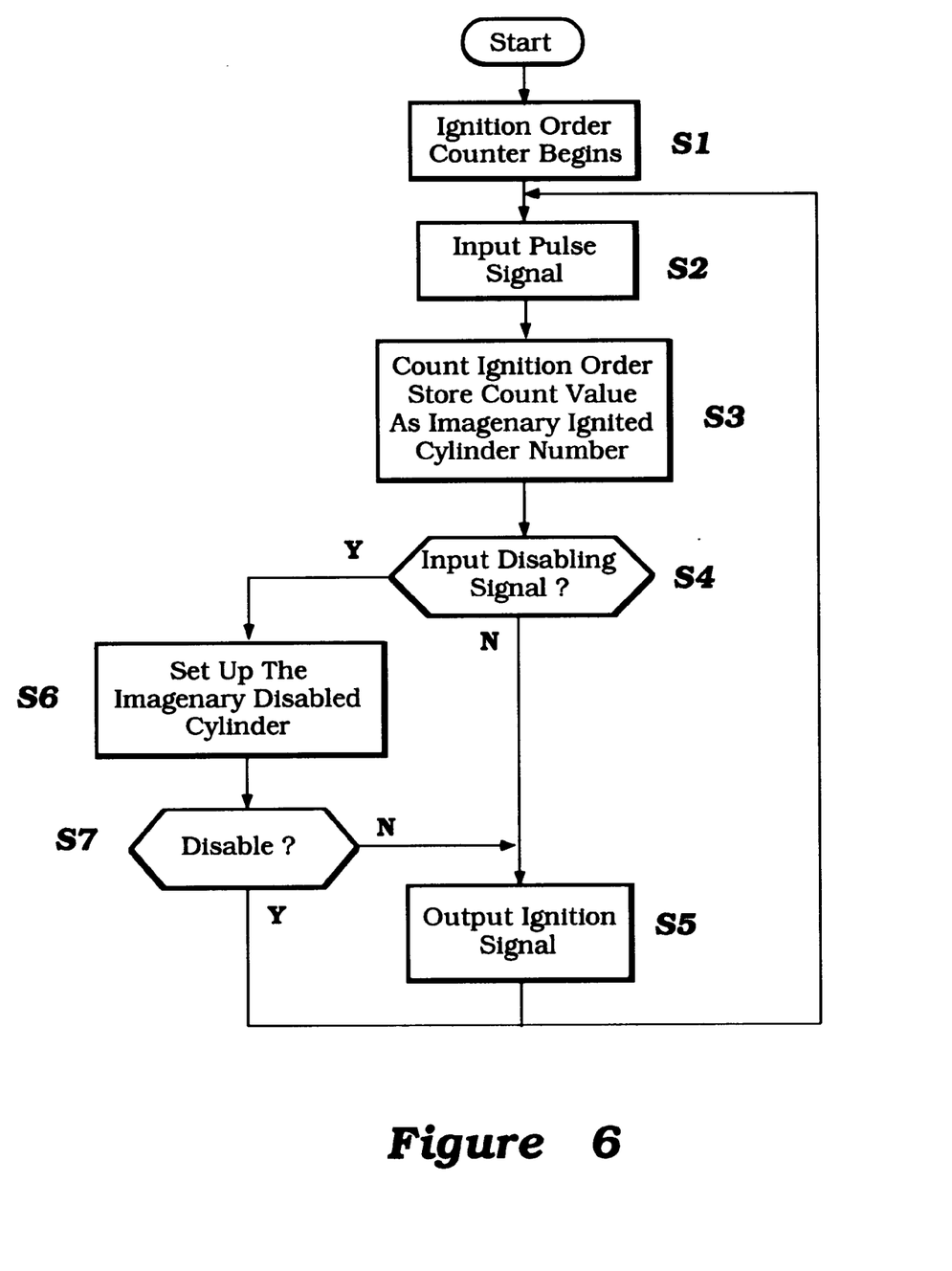
FIG. 6 is a flow chart illustrating a cylinder disabling function associated with the ignition system control.

FIG. 6 is a flowchart illustrating a cylinder disabling function of the CPU 74 as accomplished with the cylinder disabling portion 114 and counter 116. Once the engine 40 is started, and in a step S1, the ignition order counter 116 begins to function. In a step S2, an input signal is received from one of the pulser coils 70,72. In a step S3, the ignition order counter 116 assigns the signal an imaginary cylinder count number or value, as described above.

In a step S4, the CPU 74 determines if a disabling signal (as described below) has been received. If not, an ignition signal is output from the ignition signal output portion 117 of the CPU 74 to the switching circuit 76 in a step S5. If a disabling signal has been received, the cylinder disabling portion 114 of the CPU 74 is arranged to set up an imaginary disabled cylinder in a step S6. If in a step S7, if the imaginary disabled cylinder matches the imaginary ignited cylinder, then no ignition signal is provided and the process repeats. In that event, the lack of an ignition signal prevents the firing of a cylinder which is otherwise in the combustion portion of the operating cycle. If the imaginary disabled cylinder does not match the imaginary ignited cylinder, then an ignition signal is output in step 5 and then the process repeats.

Figure 7:
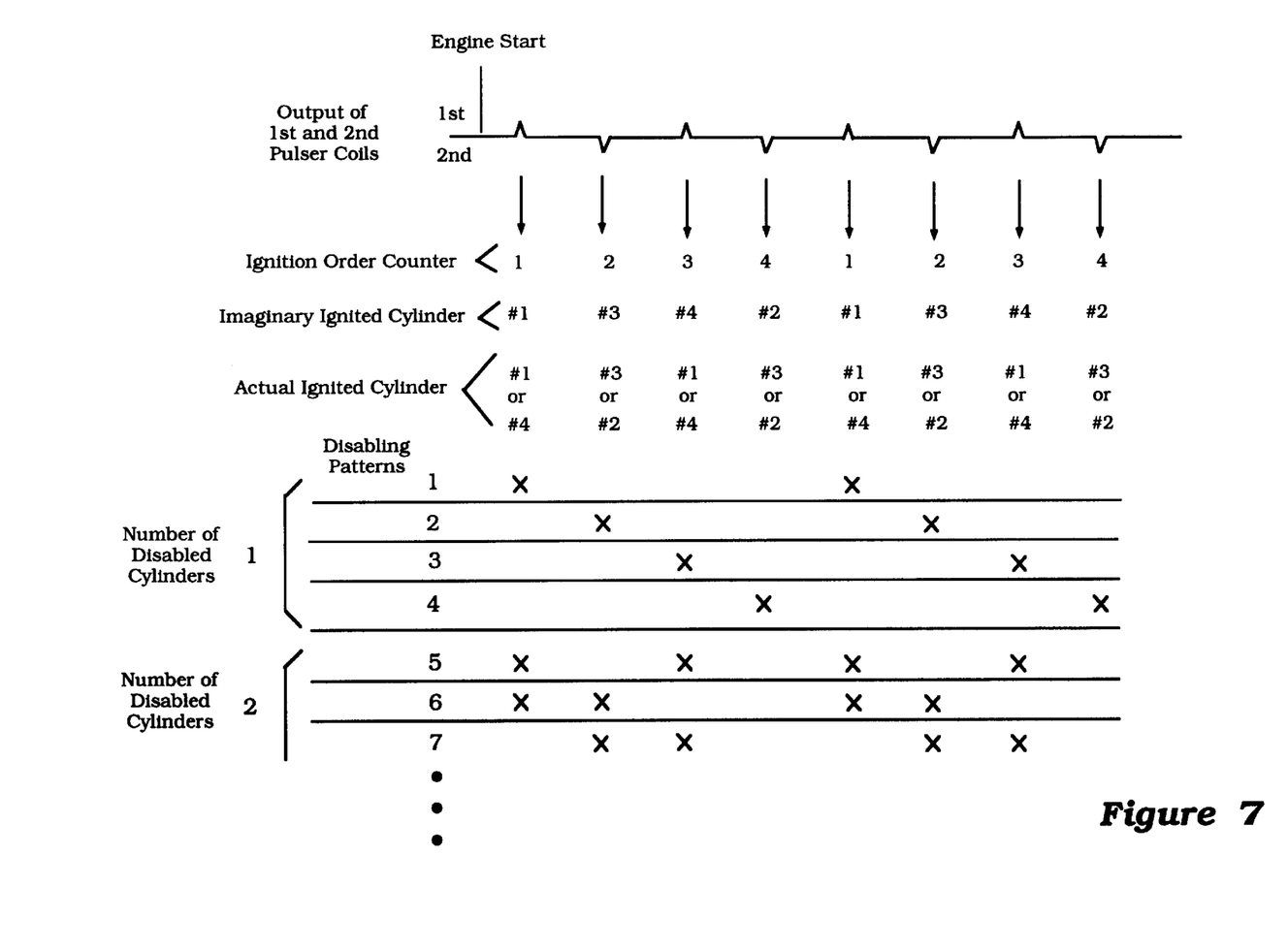
FIG. 7 is a table illustrating ignition order counter, imaginary ignited cylinder, actual ignited cylinder, fired cylinder data, and disabling cylinder patterns associated with the disabling function of the ignition control, as compared to pulser coil output.

FIG. 7 illustrates a cylinder disabling arrangement employed by the CPU 74. The disabling cylinder portion 114 of the CPU 74 is arranged to employ one or more disabling patterns for disabling one cylinder of the engine 40. In a first pattern, the imaginary disabled cylinder is given a value of one and each time the imaginary ignited cylinder value is one, no firing signal is sent by the CPU 74 to the switching circuit 76, and the spark plugs 44a,44d corresponding to the first and fourth cylinders are not fired. This means that either the first or fourth cylinder, which would otherwise be set to fire, does not fire. On the other hand, when the imaginary ignited cylinder 4 is counted, a firing signal is provided, so that either the other of the first or fourth cylinders are actually fired each cycle. Of course, a firing signal is provided at both the imaginary ignited cylinder values of 2 and 3. In this manner, three of the four cylinders are fired each cycle.

As illustrated by patterns 2–4, a similar arrangement may be employed with imaginary disabled cylinder values of 2, 3 or 4, whereby three of the four cylinders are fired.

The cylinder disabling portion 114 is also arranged to disable two of the four cylinders. With reference to pattern number 5, the imaginary disabling cylinder values are set as both 1 and 4, whereby the CPU 74 does not send a firing signal when the imaginary ignited cylinder values are 1 and 4. In this arrangement, both the first and fourth cylinders are prevented from firing, while cylinders 2 and 3 are both fired.

As illustrated, the CPU 74 may be arranged to prevent the firing of any pair of two cylinders in similar fashion. It is generally desirable to fire the cylinders in evenly spaced patterns to promote smooth running of the engine.

Though not illustrated, the cylinder disabling portion 114 includes one or more patterns for disabling three of the four cylinders in similar fashion to that described above. In addition, the cylinder disabling portion 114 includes a pattern for disabling all cylinders in which no firing signal is provided at any time.

Figure 8:
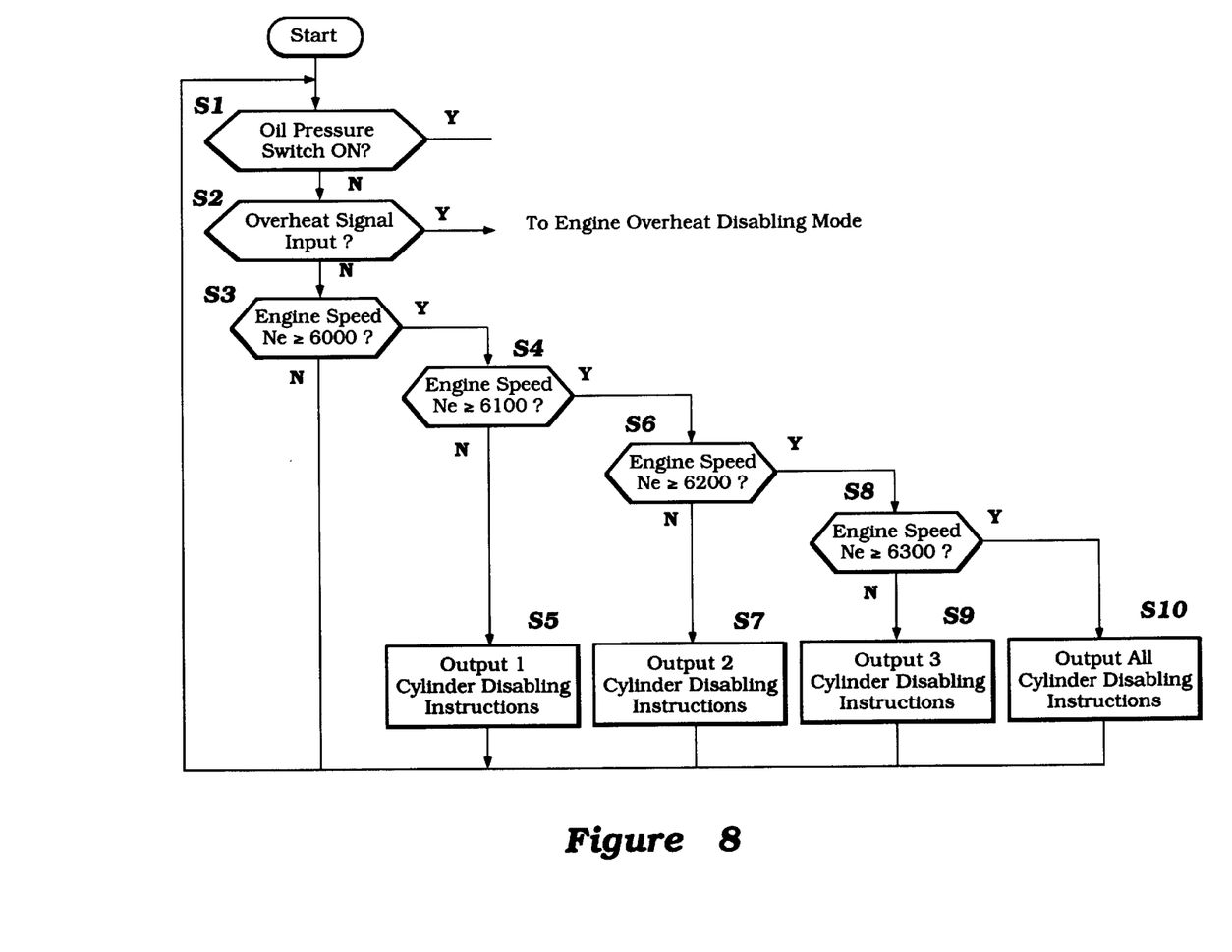
FIG. 8 is a flowchart illustrating an overrev or engine speed reduction function associated with the ignition control of the present invention.

FIG. 8 illustrates an engine speed disabling or overrev protection function of the ignition control. As illustrated, in a first step S1, the CPU 74 determines if the oil pressure switch is on. If so (indicating a lack of oil pressure), then the cylinder disabling portion 116 of the CPU 74 is arranged to disable all of the cylinders in a step S10. When all of the cylinders are prevented from running, the engine 40 stops and the user may check the lubricating system.

If the oil pressure switch is not on, in a step S2 the CPU 74 checks to determine if an engine overheat signal is received from the overheat detection portion 110. If so, an engine overheat disabling mode associated with an engine temperature control function, as described in more detail below, is instituted.

If not, in a step S3, the CPU 74 checks the engine speed as calculated by the engine speed computation portion 112. If the engine speed is less than a predetermine high engine speed, such as 6000 rpm, then in a step S3 then the process repeats itself.

If the engine speed is equal to or greater than this high speed, then in another step S4, the CPU 74 checks to see if the engine speed has become equal to or higher than a higher speed, such as 6100 rpm. If not (i.e. the engine speed is between 6000 and 6100 rpm), then in a step S5, the CPU 74 is arranged to disable one cylinder and the process repeats. This instruction is preferably input into the disabling function illustrated in FIG. 6 at step S4, wherein the cylinder disabling portion 114 employs one of the "one cylinder disabled" patterns described in conjunction with FIG. 7 to prevent the appropriate firing signal for disabling one cylinder.

If the engine speed is equal to or greater than this higher speed, then in a step S6,. the CPU 74 checks to see if the engine speed has risen to or is above a higher speed, such as 6200 rpm. If not, in a step S7, the CPU 74 disables two cylinders. If so, then in a step S8, the CPU 74 checks to determine if the engine speed is at or above a still higher speed, such as 6300 rpm. If not, then the CPU 74 disables three cylinders in a step S9, and if so, then all cylinders are disabled in step S10 and the engine is completely shut down.

Figure 9:
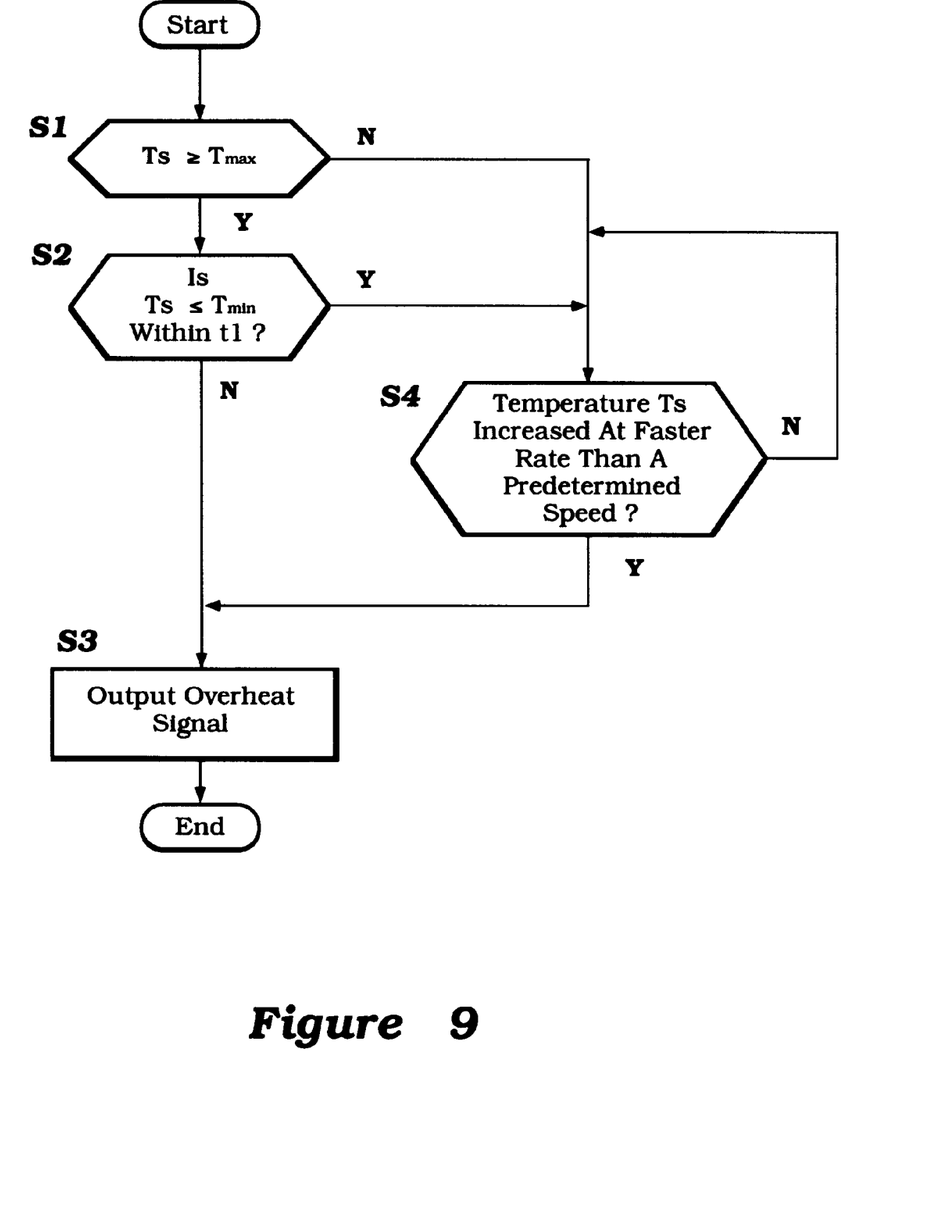
FIG. 9 is a flowchart illustrating an overheat detection system of the present invention, this system is associated with the ignition control.

FIGS. 9–12 illustrate various aspects of an engine overheat detection system of the present invention. This system includes the thermosensor 86 and the overheat detection portion 110 of the ignition control, as described above. As illustrated in FIG. 9, after the engine 40 is started, the CPU 74 is arranged to determine if an engine temperature Ts is equal to or greater than a predetermine high temperature Tmax (step S1). This temperature Ts is received from the thermnosensor 86. If so, then in a step S2, the CPU 74 checks to determine if the engine temperature Ts has fallen to a level equal to or below a predetermined low temperature Tmin within a predetermined time t1. If the temperature Ts has not fallen below Tmin, then in step S3, an engine overheat signal is output If the temperature Ts is less than Tmax in step S1, then in a step S4, it is determined whether the temperature Ts is increasing at a faster rate of speed than a predetermined rate of speed. If so, then the overheat signal is output in step S3. If not, then the CPU 74 rechecks the rate of increase in the temperature Ts.

If the temperature Ts is greater than Tmin in step S2, then the rate of increase in the temperature Ts is checked in step S4, as described above.

Figure 10:
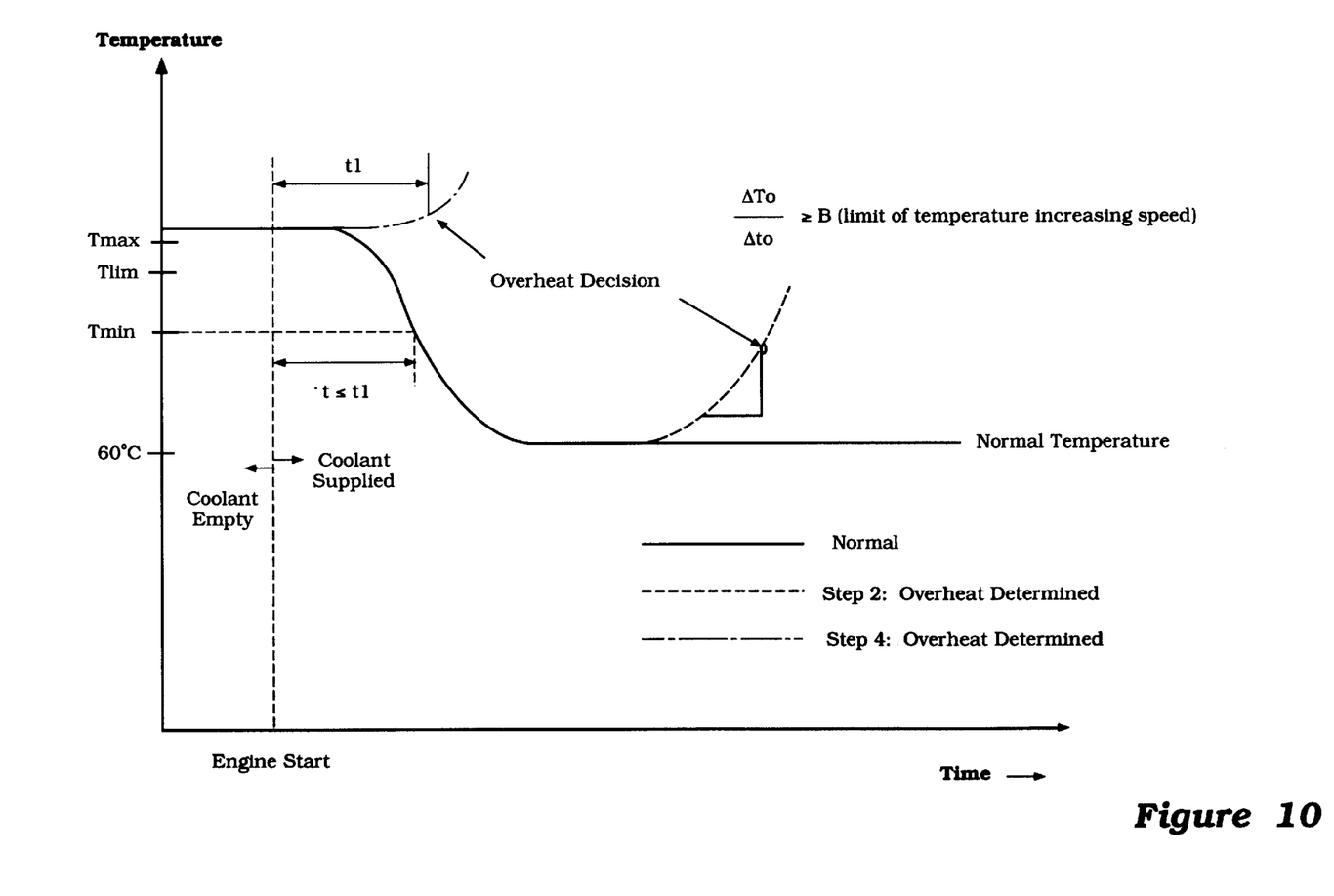
FIG. 10 is a graph illustrating temperature versus engine running time and illustrating certain aspects of the overheat detection system.

FIG. 10 is a graph illustrating aspects of this overheat detection system. As illustrated, the engine 40 is preferably of the type having a coolant system in which when the engine is not running, there is no coolant in the water jackets. Coolant fills the water jackets and other passages some time after the engine 40 is started. Preferably, the time t1 is selected so that it is a long enough to permit coolant to enter and cool the coolant jacket.

In this graph, the line for step S2 illustrates the condition when the temperature exceeds Tmax after a time t1 and an overheat condition is determined. Likewise, if the rate of increase in temperature as evident by line S4 exceeds a predetermined rate of increase $\beta=\Delta Ta/\Delta ta$, then an overheat condition is determined.

Figure 11:
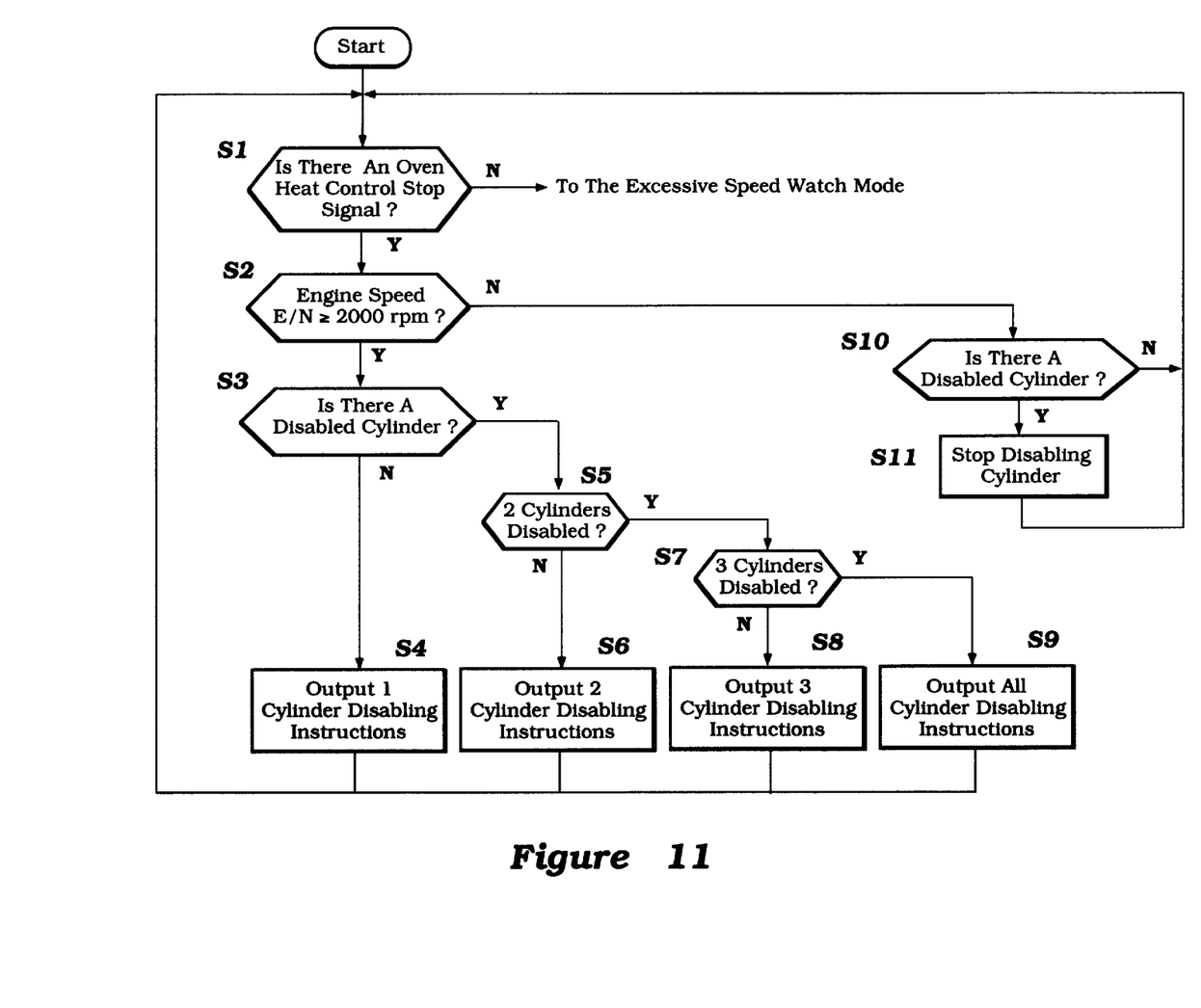
FIG. 11 is a flowchart illustrating a cylinder disabling prevention function associated with the overheat detection system of the present invention.

FIG. 11 is a flowchart illustrating an engine temperature reduction function of the ignition control associated with the overheat detection mechanism. After the engine starts, in a step S1, it is determined if there is an engine overheat detection signal. If not, then the CPU 74 is arranged to check for excessive engine speed (see flowchart illustrated in FIG. 8 and described above). If an engine overheat detection signal is received, then in a step S2, it is determined if the engine speed E/N is equal to or greater than a predetermine low speed, such as 2000 rpm. If not (i.e. the engine speed is less than 2000 rpm) then in a step S10, it is determined if there are any disabled cylinders. If not, the process returns to step S1, and if so, then these cylinders are not disabled to bring up the engine speed, and the process returns to step S1.

If the engine speed is equal to or greater than 2000 rpm, then in a step S3 it is determined if there are any cylinders disabled. If not, then in a step S4, an instruction to disable one cylinder of the engine is output (such as in step S4 of the flowchart illustrated in FIG. 6 and associated with the patterns illustrated in FIG. 7). The process then returns to the first step S1.

If there is already one disabled cylinder, then in step S5, it is determined if there are two cylinders disabled already. If not, then in step S6 an instruction to disable two cylinders is output and the process returns to step S1.

If so, then in step S7 it is determined if there are three cylinders disabled. If not, then in a step S8 an instruction to disable three cylinders is output and the process returns to step S1. If so, then in a step S9 an instruction to disable all cylinders is output Referring to FIG. 12 again, it may now be seen how the overheat detection system of the present invention overcomes the problems associated with those systems of the prior art. Referring to the lower right-hand portion of this graph, when the engine is re-started when the temperature in the cooling jacket exceeds the temperature Tlim, an overheat detection signal is not generated, since the temperature Tw in the jacket falls below Tlim due to the entry of coolant into the jacket during the predetermined time ts or t1. Of course, should coolant not enter the jacket or a similar problem be encountered, the temperature Tw would still exceed Tlim after time ts, and an overheat detection signal would be generated.

As described above, the overheat detection system includes a means for preventing the transmission of an overheat signal during the predetermined time t1. In the arrangement illustrated in FIG. 9, this means is arranged to make a comparison of the sensed temperature to the predetermined temperature Ts only after the passage of this time.

The system could be arranged so that no signal is received for the time t1 or the comparison is made but no signal may be output during time t1, as will be appreciated by those of skill in the art Of course, the foregoing description is that of preferred embodiments of the invention, and various changes and modifications may be made without departing from the spirit and scope of the invention, as defined by the appended claims.

What is claimed is:

1. An overheat detection system for an internal combustion engine having at least one combustion chamber, an intake system for supplying air to said combustion chamber and a fuel system for supplying fuel to said combustion chamber for combustion with said air, and a liquid cooling system including at least one coolant jacket into which coolant may be supplied for cooling at least a portion of said engine, said cooling system arranged to drain coolant from said coolant jacket when said engine is not running, said overheat detection system including a sensor for detecting a temperature in said cooling jacket and an overheat determining mechanism receiving an output from said sensor, said mechanism arranged to output an overheat detection signal when a sensed temperature exceeds a predetermine high temperature and means for preventing said signal from being output for a predetermined time after said engine is started to permit coolant to enter said cooling jacket upon restarting without issuing said signal.

2. The overheat detection system in accordance with claim 1, wherein said engine includes an ignition control system which is arranged to disable one or more combustion chamber in the event an overheat signal is received.

3. An overheat detection system for an internal combustion engine having at least one combustion chamber, an intake system for supplying air to said combustion chamber and a fuel system for supplying fuel to said combustion chamber for combustion with said air, and a liquid cooling system including at least one coolant jacket into which coolant may be supplied for cooling at least a portion of said engine, said cooling system arranged to drain coolant from said coolant jacket when said engine is not running, said overheat detection system including a sensor for detecting a temperature associated with said cooling jacket and an overheat determining mechanism receiving an output from said sensor, means for determining a rate of increase of the temperature sensed by said sensor, said determining mechanism arranged to output said detection signal if said rate of increase exceeds a predetermined rate of increase, and an overheat determining mechanism receiving an output from said sensor, said mechanism arranged to output an overheat detection signal when a sensed temperature exceeds a predetermine high temperature and means for preventing said signal from being output for a predetermined time after said engine is started.

* * * * *